(12) United States Patent  
Amcoff et al.

(10) Patent No.: US 9,138,788 B2  
(45) Date of Patent: Sep. 22, 2015

(54) DEVICE AND METHOD HAVING A DUCT FOR COLLECTING WASTE WATER FROM TURBINE ENGINE WASHING

(75) Inventors: Henrik Amcoff, Nacka (SE); Helena Nyberg, Stockholm (SE)

(73) Assignee: EcoServices, LLC, Farmington, CT (US)

( * ) Notice: Subject to any disclaimer, the term of this patent is extended or adjusted under 35 U.S.C. 154(b) by 811 days.

(21) Appl. No.: 12/729,873

(22) Filed: Mar. 23, 2010

(65) Prior Publication Data

US 2011/0232697 A1 Sep. 29, 2011

(51) Int. Cl.
- *B08B 17/02* (2006.01)
- *B08B 17/00* (2006.01)
- *B08B 3/02* (2006.01)
- *B08B 9/00* (2006.01)
- *B64F 5/00* (2006.01)

(52) U.S. Cl.  
CPC . *B08B 17/00* (2013.01); *B08B 3/02* (2013.01); *B08B 9/00* (2013.01); *B08B 17/025* (2013.01); *B64F 5/0018* (2013.01); *F05B 2260/602* (2013.01)

(58) Field of Classification Search  
CPC .......... B08B 3/00; B08B 3/02; B08B 17/025; B64F 5/0018  
USPC ...................................... 134/104.2  
See application file for complete search history.

(56) References Cited

U.S. PATENT DOCUMENTS

| 2,588,842 | A | * | 3/1952 | Hutt | ................................ 248/82 |
| 2,700,186 | A | * | 1/1955 | Stover | ........................... 264/268 |
| 5,899,217 | A | | 5/1999 | Testman, Jr. | ................ 134/104.4 |
| 2003/0209256 | A1 | | 11/2003 | Tadayon | |
| 2006/0219269 | A1 | * | 10/2006 | Rice et al. | ........................ 134/34 |
| 2008/0149141 | A1 | * | 6/2008 | Sales | ............................ 134/22.1 |
| 2009/0283117 | A1 | | 11/2009 | Blatch | |

FOREIGN PATENT DOCUMENTS

| GB | 2002871 A | 2/1979 | |
| JP | 2008537583 A | 9/2008 | |
| WO | WO 2005/121509 A1 | 12/2005 | .............. F01D 25/00 |

OTHER PUBLICATIONS

International Search Report, mailed Jun. 26, 2012.  
Japanese Office Action from Application Serial No. JP2013-501373, mailed Sep. 2, 2014, 8 pages.

* cited by examiner

*Primary Examiner* — David Cormier  
(74) *Attorney, Agent, or Firm* — Kinney & Lange, P.A.

(57) ABSTRACT

A collection apparatus is provided for collecting waste water from cleaning operations performed on aircraft turbine engines. It comprises a frame structure having a pivotally mounted support arm. An actuator device is arranged to rise and lower the support arm between an essentially horizontal transport position to an operative position. A flexible duct is provided with an inlet end and an outlet end. The inlet end of the flexible duct is pivotally attached to the support arm so as to be movable around at least a horizontal axis.

12 Claims, 8 Drawing Sheets

DEVICE AND METHOD HAVING A DUCT FOR COLLECTING WASTE WATER FROM TURBINE ENGINE WASHING

TECHNICAL FIELD

The present disclosure generally relates to the field of washing jet engines, particularly using washing liquids such as water and detergent or water only, and more specifically to a system, and devices for collecting and treating the waste water from engine washing operations and a mobile vehicle comprising such a system.

BACKGROUND

A gas turbine engine installed as an aircraft engine comprises a compressor compressing ambient air, a combustor burning fuel together with the compressed air and a turbine for driving the compressor. The expanding combustion gases drive the turbine and also result in thrust used for propelling the aircraft.

Air breathing machines like jet engines consume large quantities of air. Air contains foreign particles in form of aerosols or larger particles which then enters the engine with the air stream. The majority of the particles will follow the gas path through the engine and exit with the exhaust gases. However, some particles have properties that cause sticking on to components in the engine's gas path. Buildup of particles changes the aerodynamic properties of the engine and more particularly reduces engine performance. Typical contaminants found in the aviation environment are pollen, insects, engine exhaust, leaking engine oil, hydrocarbons coming from industrial activities, salt coming from nearby oceans, chemicals coming from aircraft de-icing and airport ground material such as dust.

The contaminants sticking on to components in the engine gas path may cause fouling of the engine. The consequence of gas path fouling is an engine operating less efficiently than normal. With the reduction in efficiency, the engine is less economic to operate and produces higher emissions. Fouling will result in more fuel having to be burnt to achieve the same thrust as a clean engine. Further, an environmental drawback is found with the higher fuel consumption in form of increased carbon dioxide emissions. In addition, more fuel being burnt results in higher temperatures in the engine's combustor. With this also comes high temperature exposure to engine hot gas path engine components. The higher temperature exposures can dramatically shorten the life expectancy of the engine. The higher firing temperature results in increased formation of NOx which is yet another environmental drawback. In summary, the operator of a fouled engine can suffer from reduced engine lifetime, unfavorable operating economics and higher emissions. Therefore, airline operators have a strong incentive to keep their engines clean.

It has been found that the only reasonable way to combat fouling is to wash the engine. Washing can be practised by directing a water jet from something as simple as a garden hose towards the engine inlet. However, this method has limited success due to the rudimentary nature of the process. An alternative method is pumping the wash liquid through a manifold with special nozzles directed towards the engine inlet face. The manifold would be temporarily positioned near the inlet of the engine. This can include mounting the manifold on the engine cowl or on the engine shaft bullet during the wash operation. Simultaneously with spraying the washing liquid towards the engine inlet, the engine shaft is cranked such as by the use of its starter motor. The shaft rotation enhances the wash result by the mechanical movements and by forcing air with washing liquid entrained therein through the engine. This allows the wash liquid to move over greater surface area as well as enhancing liquid penetration into the interior of the engine. The method is proven successful on most gas turbine jet engines types.

A proper wash operation of a gas turbine engine can be confirmed by an observation of the wash liquid that exits the engine at the engine outlet. At the engine outlet the wash liquid has become a waste liquid. The waste liquid may leave the engine outlet as a stream of liquid pouring to the ground. Alternatively the waste liquid may be carried with the air stream as fine droplets where the air stream is the result of the rotation of the engine shaft. This air borne liquid can be carried a significant distance before falling to the ground. It is shown from actual wash operations that waste liquid will be spread on a large surface area, typically more than 20 meters downstream of the engine outlet. It is undesirable to spread waste liquid on the ground behind an engine. Thus, a method and apparatus to collect the waste liquid exiting the engine is desired.

The waste liquid exiting the engine at washing consists of the wash liquid entering the engine together with released fouling material, combustion solids, compressor and turbine coating material, and oil and fat products. The waste liquid may be hazardous. As one example, analysis of water collected from actual turbine engine washing operations have been shown to contain cadmium. The cadmium comes from compressor blade coating material released during washing operation. Cadmium is extremely environmentally sensitive and can not be allowed to be disposed to the environment. Waste liquid containing such materials will likely have to undergo treatment for separation of hazardous components before being disposed into a sewer or by other means.

Gas turbine aircraft engines can be of different types such as turbojets, turboprop, turbo-shaft and mixed or un-mixed turbofan engines. These engines cover a large performance range and may include different design details delivered by different manufacturing techniques. Aircraft types for a particular service may be offered from different aircraft manufacturers; thus the design of aircraft and engines may vary. Further, aircraft manufacturers may offer different engine options for the same aircraft type. The large combined possibility of engines on aircraft types and from different aircraft manufacturers result in a practical problem in designing a system for collecting and treating waste wash liquid that is generally applicable to most winged aircraft. U.S. Pat. No. 5,899,217 to Testman, Jr. discloses an engine wash recovery system that is limited to small, and particularly turboprop, engines as the container used in the invention is not applicable to the air flows emanating from e.g. large turbo-fan engines.

Collecting waste water from engine washing may be accomplished by hanging canvas like collectors under the engine nacelle. However, any operation resulting in anything being hooked on to an engine has the disadvantage that it may subject the engine to damage.

A system of the above described type is disclosed in International application WO 2005/121509 (owned by Gas Turbine Efficiency AB). This system comprises a liquid separating means and a collecting device for collecting waste liquid during a washing operation of an engine. It also has a treatment device for treating waste liquid collected during said washing operation. The system is provided on a mobile vehicle to service an engine with a washing operation wherever the engine may be. The vehicle comprises a chassis provided with wheels and there is a means for adjusting the position of the liquid separator and/or the liquid collector and/or the liquid storage means relative the engine.

The above discussed system may not be readily usable for types of aircraft having their exhausts located at a non-perpendicular orientation with respect to the aircraft body or being positioned centrally on the body. The system may also not be readily usable for collecting the smallest droplets in an airflow exiting the engine outlet during washing operation of an engine.

SUMMARY

It would be beneficial to provide an improved method and apparatus that is easy to install and remove and that enables collection of even the smallest droplets in an airflow emanating from the engine cleaning operation for aircraft types having the exhaust(s) located in positions difficult to reach with prior art systems.

A first aspect of the disclosure includes a collection apparatus for collecting waste liquids from cleaning operations performed on aircraft turbine engines. The collection system has a frame structure, a support arm, a waste liquid storage tank, a duct and an actuator device. The support arm has a first arm attached to the frame structure and an opposing second arm. The duct has an inlet positionable at the exhaust of a turbine engine and an outlet end that is removably, sealingly connected to the waste liquid storage tank. The inlet end is pivotally attached to the second end of the support arm and is movable about the horizontal axis. The actuator device enables raising and lowering the support arm between an essentially horizontal position to an operative position.

A second aspect of the disclosure provides a method of collecting waste liquid from the cleaning of gas turbine engines. The method includes providing a duct that is pivotally attached to a support arm and moveable about the horizontal axis. The duct has inlet and outlet ends. The support arm is attached to a frame structure and operable by an actuator device. The method further includes raising the support arm and moving the inlet end of the duct to a position proximate the engine exhaust and collecting waste liquid from the cleaning operation.

BRIEF DESCRIPTION OF THE DRAWINGS

For the purpose of illustrating the disclosure, the drawings show various exemplary forms. It should be understood that the disclosure is not limited to the precise arrangement and instrumentality shown in the drawings.

DETAILED DESCRIPTION

Figure 1:
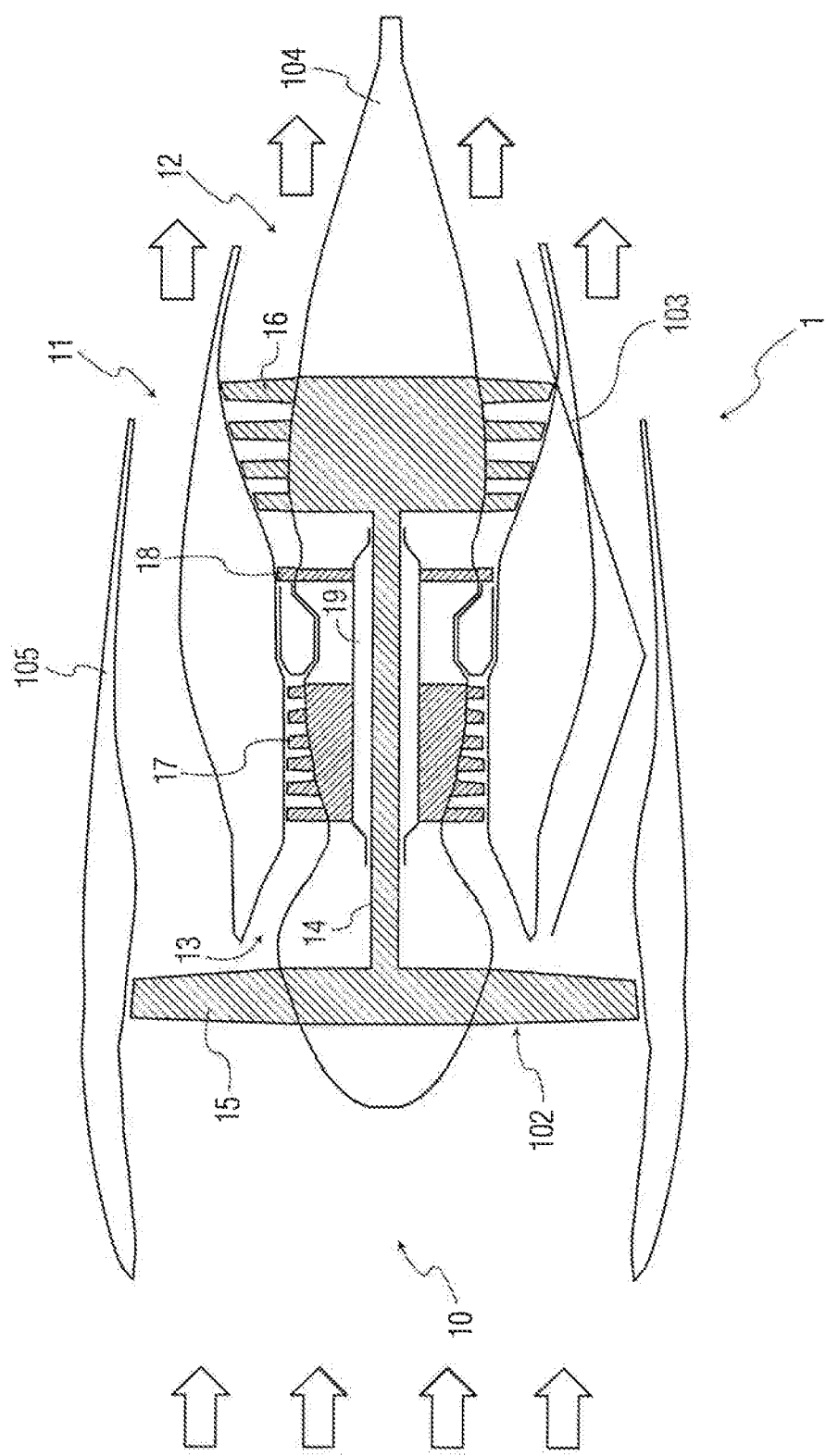
FIG. 1 shows a cross section of an un-mixed turbo-fan gas turbine engine.

The disclosure can be practised on several engine types such as turboshaft, turboprop, turbojet and mixed/un-mixed multi shaft turbo fan engines, but in particular it is aimed for use with helicopters and turboprop powered aircraft. The disclosure is also useful for cleaning of military aircraft. It will be appreciated that the following description is intended to refer to specific aspects of the disclosure selected for illustration in the drawings and is not intended to define or limit the disclosure, other than in the appended claims.

FIG. 1 shows a cross section of an un-mixed turbofan engine. This engine is of a common type, which may be found on large aircraft such as those used for passenger service. Engine 1 comprises of a fan section 102 and a core engine section 103. Air flows are indicated by arrows. Engine 1 has an inlet 10 where air enters the engine. The air flow is driven by fan 15. One portion of the air flowing through the inlet exits at outlet 11. The remaining portion of the inlet air enters into the core engine at core inlet 13. The air entering the core engine is compressed by compressor 17. The compressed air together with fuel (not shown) is combusted in combustor 101 resulting in pressurized hot combustion gases. The pressurized hot combustion gases expand towards core engine outlet 12. The expansion is done in two stages. In a first stage the combustion gases expand into an intermediate pressure while driving turbine 18. In a second stage the combustion gases expand towards ambient pressure while driving turbine 16. Turbine 16 is driving fan 15 via shaft 14. Turbine 18 is driving compressor 17 via a second shaft 19 where the second shaft 19 is coaxial to the first shaft 14.

Figure 2:
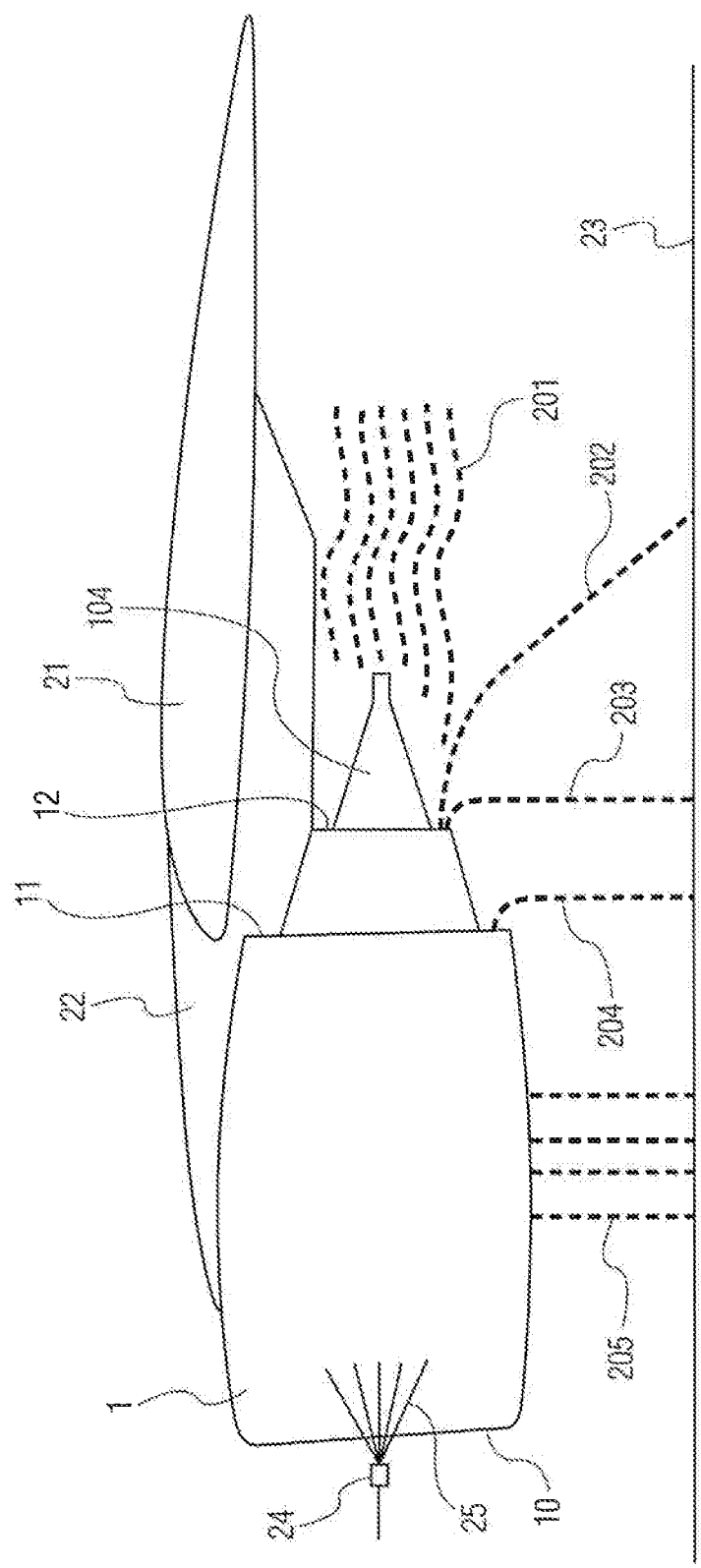
FIG. 2 shows the un-mixed turbo-fan engine of FIG. 1 with waste liquid exiting the engine during washing thereof.

In FIG. 2 the engine described in FIG. 1 is subject to an engine washing procedure. Similar parts are shown with the same reference numbers as FIG. 1. FIG. 2. shows an outside side view of engine 1. Engine 1 is an "under-wing engine" installed under wing 21 using support 22, where wing 21 is part of an aircraft. A manifold (not shown) for injecting washing liquid is installed in or adjacent the engine inlet 10 of engine 1. The manifold holds a plurality of nozzles 24 in position upstream of the fan. A wash pump unit (not shown) pumps a washing liquid through nozzles 24 forming spray 25 directed toward the fan and core engine air inlets. The liquid cleans the gas paths of the fan and the core engine. To enhance the cleaning effect the engine shafts may be cranked by the use of the engine's starter motor. Cranking of the shafts enables the liquid to move around inside the engine for achieving enhanced cleaning effect. The rotation of the shafts results in an airflow carrying the liquid through the engine towards the engine outlet hence liquid will exit the engine at the rear. Liquid exiting the engine is waste liquid.

Liquid may exit the engine in at least five different ways as shown in FIG. 2. The first liquid category, stream 201, will exit the core engine outlet 12 as droplets entrained in the engine airflow. The droplets that make up stream 201 are contained in the exhaust stream generated inside the engine by the motion of the compressor and turbines blades. Stream 201 comprises of droplets with a large range of sizes where the different droplet sizes have different characteristics. The smallest droplets, i.e. droplets less than 30 microns will typically quickly evaporate in the ambient air due to their small size. Droplets less than 30 microns are therefore typically not of as much concern in the waste water collection process because of the evaporation, and because they represent only a small volume of the waste liquid. The largest droplets in stream 201 are droplets that are close to the size of raindrops, e.g. 2000 um size. These droplets are heavy and will not evaporate but fall to the ground due to gravity. Droplets greater than 30 microns but less than 2000 microns will be carried with the air stream and eventually fall by gravity to ground 23, with some travelling up to 20 meters or more behind the engine outlet. The second liquid category, stream 202, consists of strings of liquid and other large chunks of liquid. Stream 202 quickly falls to the ground 23 by gravity. The third liquid category, stream 203, is liquid pouring as a solid stream out of the core engine outlet 12. This liquid pours typically vertically to ground 23. The fourth liquid category, stream 204, is liquid pouring out from the fan duct outlet 11. This liquid falls basically vertically to ground 23. The fifth liquid category, stream 205, is liquid dropping or pouring from the bottom of the engine nacelle. The source for this liquid is for example the combustor drain valves being open. According to the disclosure, a method and apparatus is disclosed for collecting waste liquid exiting the engine as described in FIG. 2.

Figure 3:
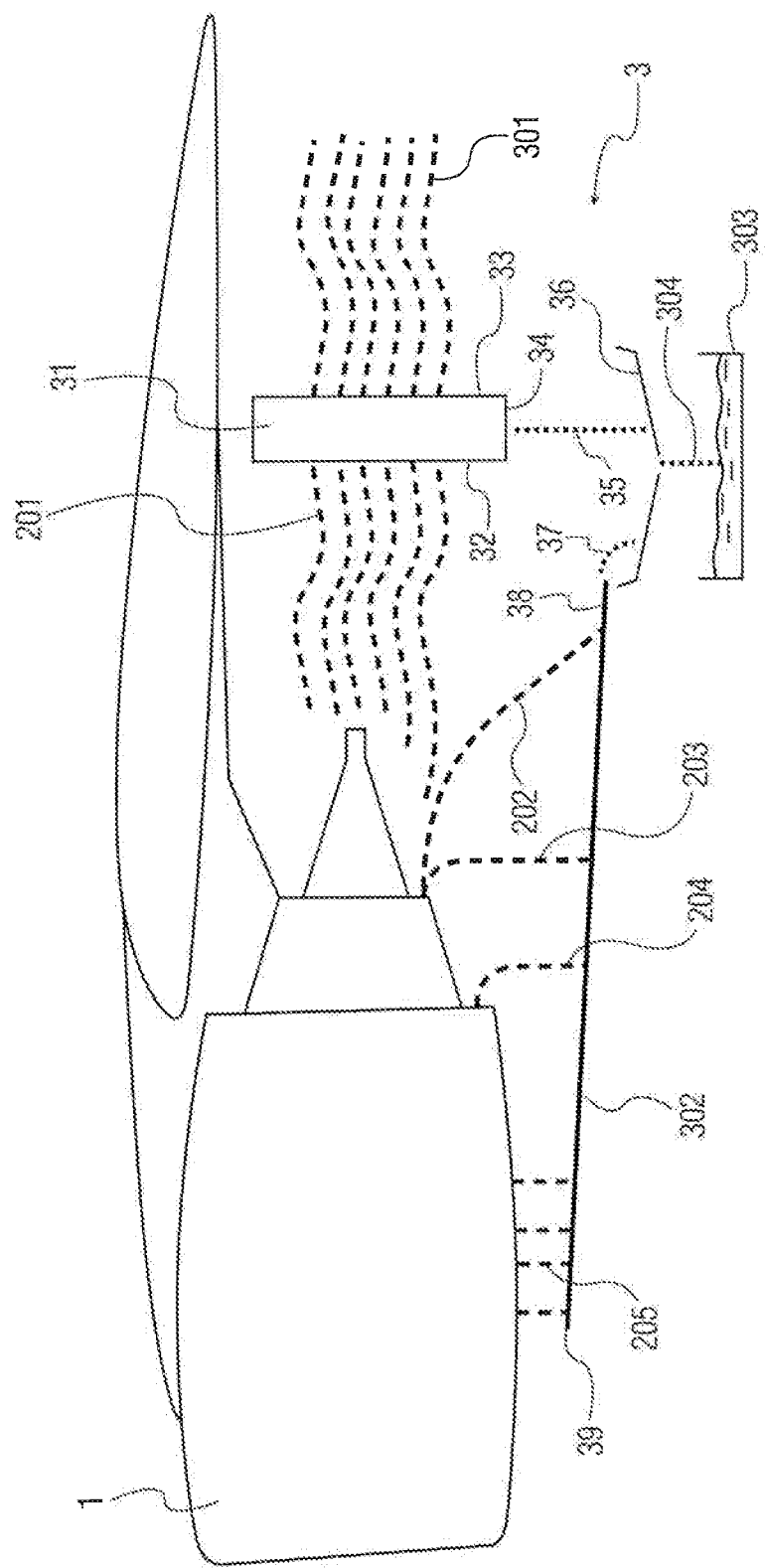
FIG. 3 shows a waste liquid collecting device according to the prior art.

FIG. 3 shows a side view of engine 1 and how waste liquid is collected during washing according to the prior art system disclosed in WO 2005/121509, the entire contents of which is hereby incorporated by reference. Similar parts are shown with the same reference numbers as FIG. 2. Collector 3 has a liquid separation device 31, a trough 36 and a chute 302. Liquid exiting the engine as stream 201 is separated from the carrier air in liquid separation device 31. Liquid exiting the engine as stream 202, stream 203, stream 204 and stream 205 are collected by chute 302. The liquid emanating from liquid separation device 31 and chute 302 is collected in trough 36.

FIG. 3 shows chute 302 installed under engine 1. Chute 302 will collect liquid 202, 203, 204 and 205 as shown in FIG. 3. Chute 302 has a front end 39 and a rear end 38 where front end 39 is positioned vertically higher than rear end 38. As front end 39 is higher than rear end 38, the chute is inclined. The inclination of chute 302 will allow liquid in the chute to flow from the left to the right in FIG. 3. Rear end 38 is positioned above trough 36 so that liquid will pour out of chute 302 into trough 36 as stream 37. According to an alternative embodiment, chute 302 is incorporated in trough 36 and tank 302, thereby forming one single unit.

The liquid that exits the engine during washing contains water, detergent and foreign matter. The foreign matter is in form of solids and ions dissolved in the water. What comes out of the engine at a specific wash occasion depends on a number of issues such as when washing was last conducted, the environment in which the engines operates, etc. Further, the waste liquid may at one wash occasion contain a high amount of solids while at another wash occasion be low on solids. Similarly, the waste liquid may at one wash occasion contain a high amount of ions while at another wash occasion be low on ions. This results in that the waste water treatment system must be flexible in its design so that the most appropriate treatment can be conducted at each occasion.

Figure 4:
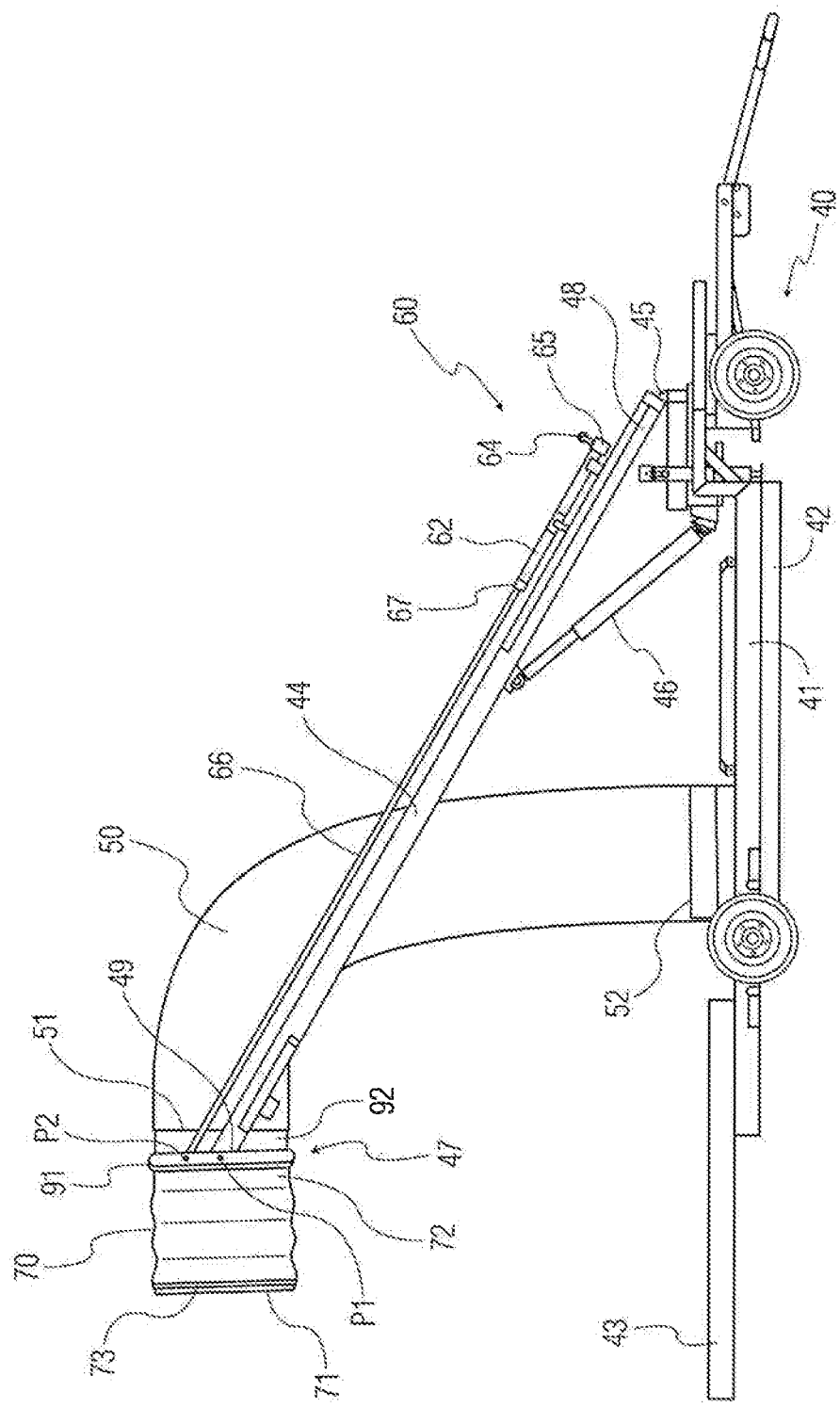
FIG. 4 illustrates a first embodiment of a collection system.

In FIG. 4 there is shown one exemplary embodiment of a water collection system according to the present disclosure. The collection system is designed as a mobile vehicle 40. The mobile vehicle 40 may be a cart, towed trailer or have its own power, as example, or may comprise other suitable types of vehicles. The mobile vehicle 40 is provided with a water tank 42 for storing water that has been collected during a washing operation. On the vehicle 40 there is a drip pan 43. The drip pan 43 is to be positioned beneath the engine to be cleaned so as to collect liquid that exits from the engine and falls towards the ground. Because of the large size of some engines and because engines differ in size, the drip pan 43 may slide from a retracted position on the vehicle 40 to a fully extended position in where the drip pan protrudes out from the cart chassis, in some cases about 10 feet. The drip pan 43 itself normally measures 8' by 5' (length/width). The drip pan 43 may also be releasable from the vehicle 40 and can be placed on the ground, in cases where the available space beneath the aircraft is too small to accommodate the entire vehicle 40.

On the vehicle 40 there is also provided an arm or bar 44, having a first end 48 and a second end 49, which arm 44 can be of a fixed length, as shown in the figure, or which can be telescopically extendable (not shown). The first end 48 of the arm 44 is pivotally linked to the chassis of the vehicle 40 at pivot axis 45. The arm 44 can thus be raised from an essentially horizontal position to an upright position by means such as a hydraulically actuated linking arm 46. Of course other means can be used for moving the arm 44, such as pneumatic, mechanical gear system etc. Actuation can easily be achieved by a foot pump, or alternatively by suitable electrical pump means.

A duct 50, having an inlet end 51 and an opposite outlet end 52, is mounted with its inlet end 51 proximate the second end 49 of the arm 44 via a duct support 47, comprising a bar structure 91 and a ring 92, with the bar structure 91 extending around at least a part of the circumference of the ring 92 and the ring 92 extending around the circumference of the inlet end 51 of the duct 50. The bar structure 91 of the duct support 47 is attached to the support arm 44 in a pivot point P1, thereby allowing the inlet end 51 of the duct 50 to be turned/rotated around a horizontal axis, i.e., it can be tilted forwards and backwards. Said outlet end 52 of said duct (50) is removably and sealingly connected to the waste liquid storage tank 42.

Figure 5:
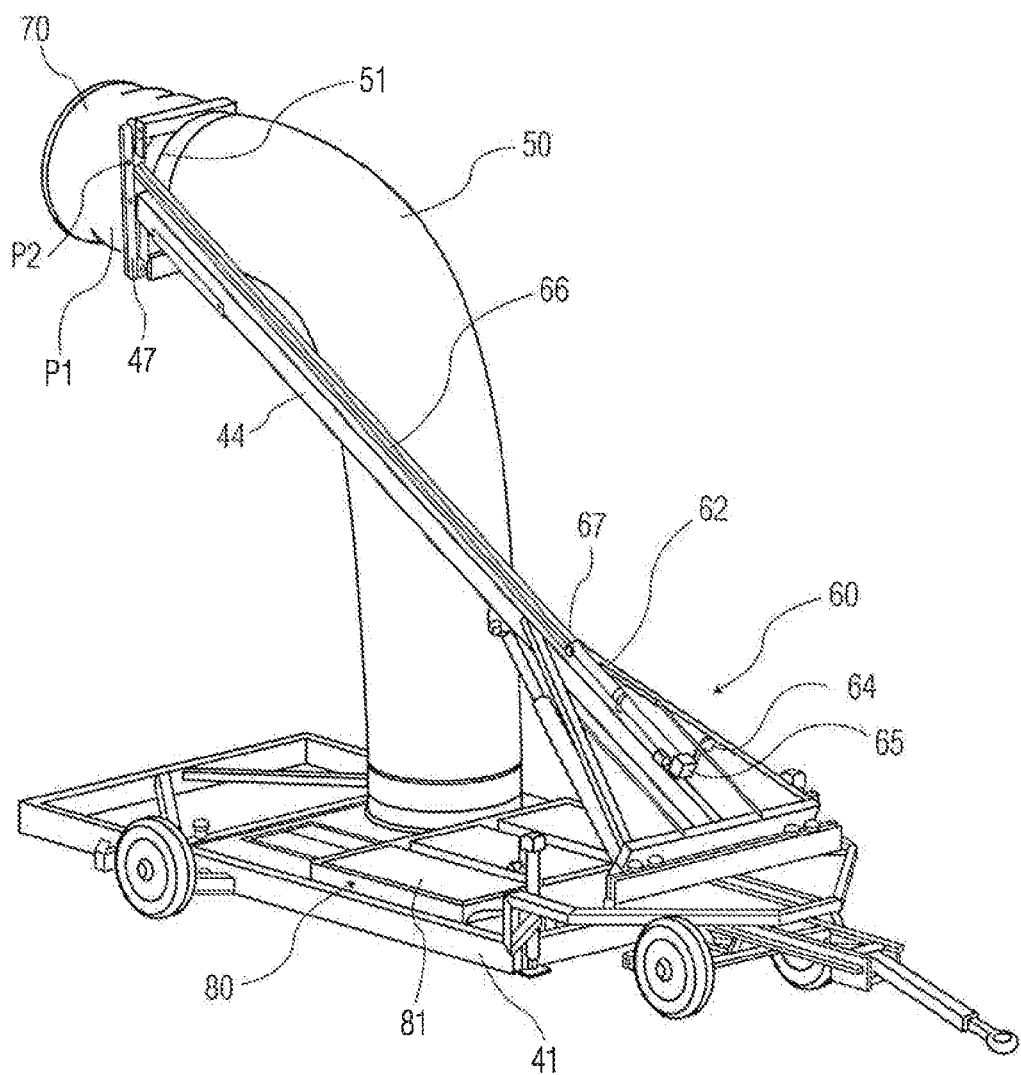
FIG. 5 shows a first embodiment of a mechanism for tilting the inlet end of a duct.

During the engine cleaning operation, the inlet end 51 of the duct 50 is positioned at the engine exhaust. Liquid exiting the engine as stream 201 (see FIG. 3) is collected together with the carrier air by said inlet end 51 of the duct 50 and transferred to said waste liquid storage tank 42, suitably located on the mobile vehicle 40 on which the entire system is mounted. The waste liquid storage tank 42 is provided with an air outlet 80 and a filter 81 (see FIGS. 5 and 6) disposed in said air outlet 80 so as to restrict liquid spray and contaminants entering waste liquid storage tank 42 from exiting the air outlet 80. The filter 81 is provided with an inlet end facing the interior of the waste liquid storage tank 42 and an outlet end facing away from the waste liquid storage tank 42. Further, the filter 81 is provided with channels (not shown in the figures) running through the filter in for example a labyrinthine pattern so that airborne droplets following the air stream leaving the waste liquid storage tank 42 are trapped inside the filter 81. Hence, the stream will be essentially free from liquid after passing through the filter 81. The influence of the gravity on the liquid trapped inside the filter 81 causes the liquid to drain to the bottom of the filter 81 and eventually fall by gravity into the waste liquid storage tank 42.

At the inlet end 51 of the duct 50 there may be provided a flexible duct connection 70. The duct connection 70 has an inlet end 71 provided with a strap or an elastic rim 73 around the opening and an outlet end 72 for removably and sealingly connecting to the inlet end 51 of said duct 50 via the ring 92 of the duct support 47. The inlet end 71 of the duct connection 70 is placed tightly around the engine exhaust, providing a seal against the aircraft, such that even the smallest droplets in the airflow emanating from the engine exhaust is guided into the duct 50.

Figure 7A:
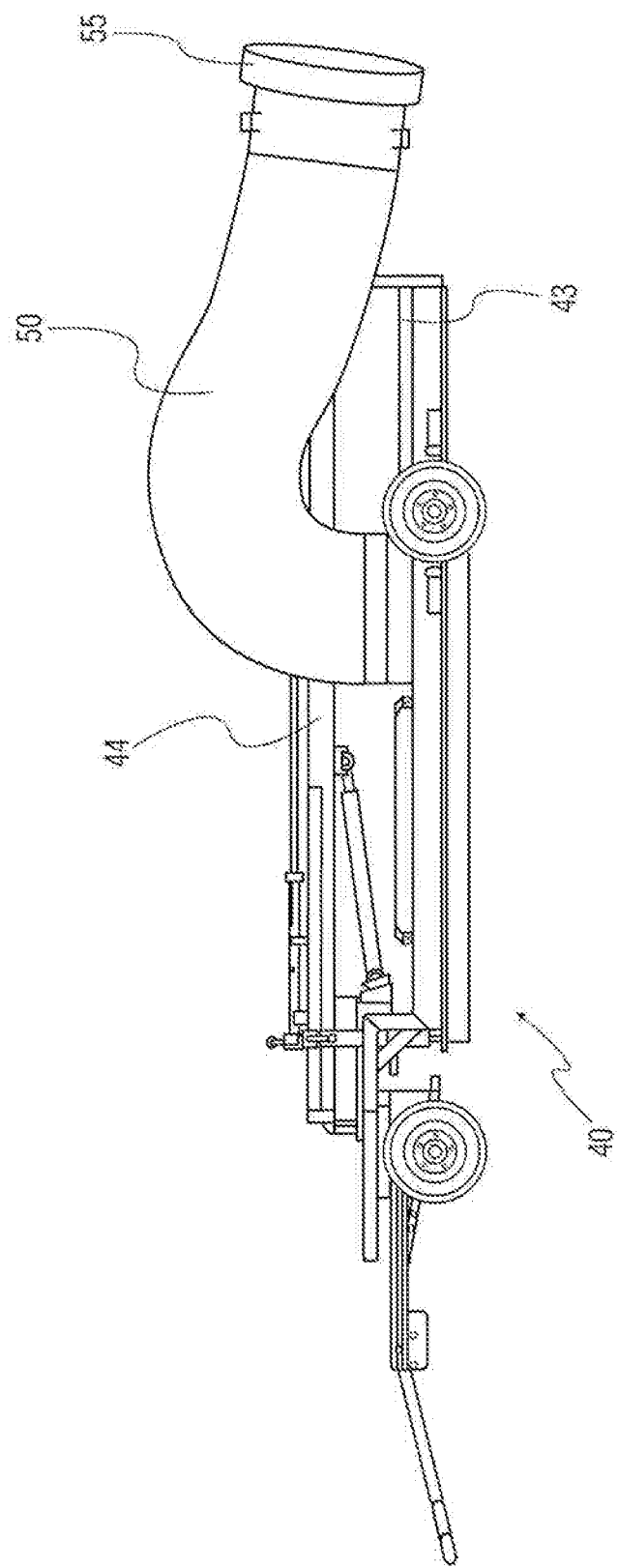
FIGS. 7*a-b*; show further modes of operation of the apparatus shown in FIG. 4.

As shown in FIG. 7a, the duct 50 is provided with a collar or flange 55, for example, made of rubber, along the inlet end 51 opening. This collar 55 is suitably made from rubber tubing or sheet rubber and is attached to the opening of the inlet end 51 of the duct 50 such that it provides an impact protection where the flange 55 engages an engine. Thus, when the inlet end 51 of the duct 50 is brought near the aircraft body, the collar 55 which of course is resilient will prevent the aircraft from being scratched by the ring 92.

Actuation of the duct support 47 to move the inlet end 51 of the duct 50 can be by hydraulic means (not shown) or by any other suitable actuating means. By way of example, pneumatic systems could be used as well as mechanical motor driven gear mechanisms as well as other options known to those skilled in the art.

In one embodiment the manipulation of the duct support 47, and hence also the inlet end 51 of the duct 50, in the backwards and forwards direction, referred to as tilting of said inlet end 51, is achieved by what is herein referred to as a tilting actuator device. Such a device, generally designated 60, in the embodiment in FIG. 5, comprises a linear actuator such as a screw drive. In such an embodiment, a threaded rod (not visible in the figure) is actuated to rotate inside an outer tube 62, by means of a crank 64 coupled to a gear mechanism transforming (inside housing 65) the cranking movement to a rotary movement of the threaded rod. Inside the outer tube 62 there is an inner tube at the lower end of which there is a nut attached, e.g. by welding. The nut is threaded onto the rod, and thus the inner tube, having an outer diameter slightly smaller than the inner diameter of the outer tube 62, will be guided inside the outer tube 62. At the upper end of the inner tube there is an actuating arm 66 linked to the inner tube by a pivot axis 67. Thus, when the threaded rod rotates the nut, the inner tube will move along the length of the rod in the longitudinal direction, and thus the arm 66 will either push or pull the duct support 47, and the inlet end 51 of the duct 50, depending on the direction of the rotation. The actuating assembly is preferably located on the upper side of the support arm 44.

The actuating arm 66 is coupled to the duct support 47 at a pivot point P2, such that when the rod is expelled out of the tube 62 the duct support (47), and hence also the inlet end 51 of the duct 50, is tilted forwards, and when the rod is retracted into the tube the duct support 47, and hence also the inlet end 51 of the duct 50, is tilted backwards, with the entire device pivoting around pivot point P1.

The above embodiment is only an example, and as mentioned by other types of linear actuator mechanism can easily replace it.

To adjust the position of the inlet opening of the duct 50 in a sideways direction, the flexible duct connection 70 may be used. The flexible duct connection 70 can easily be turned/bended up/down/left/right so as to place the inlet end 71 of the duct connection 70 in a correct position for the collection operation.

To operate the apparatus for positioning the inlet end 51 of the duct 50 at e.g. a helicopter exhaust, the arm 44 is first raised by actuating the raising mechanism. When a desired height has been reached the vehicle 40 is moved to a position in the vicinity of the exhaust. Then the tilting mechanism is used to tilt the inlet end 51 of the duct 50 forwards or backwards. For adjusting the position of the inlet opening of the duct 50 both up/down and in sideways direction, the duct connection 70 is used as explained above.

The mechanism described above is one exemplary embodiment and many other types of actuating devices and/or mechanisms are possible. One exemplary mechanism could be the provision of a "joy stick" type device for electrically controlling hydraulic, pneumatic, mechanical or solenoid actuators, acting on the movable components so as to bring about the required positioning of the inlet end 51 of the duct 50.

By providing this very versatile manipulation possibility, the inlet opening of the duct 50 can be positioned at outlets that have previously been inaccessible i.e. because of their position at or on the aircraft body, especially those forming an angle with the body of 10-60°.

Figure 6:
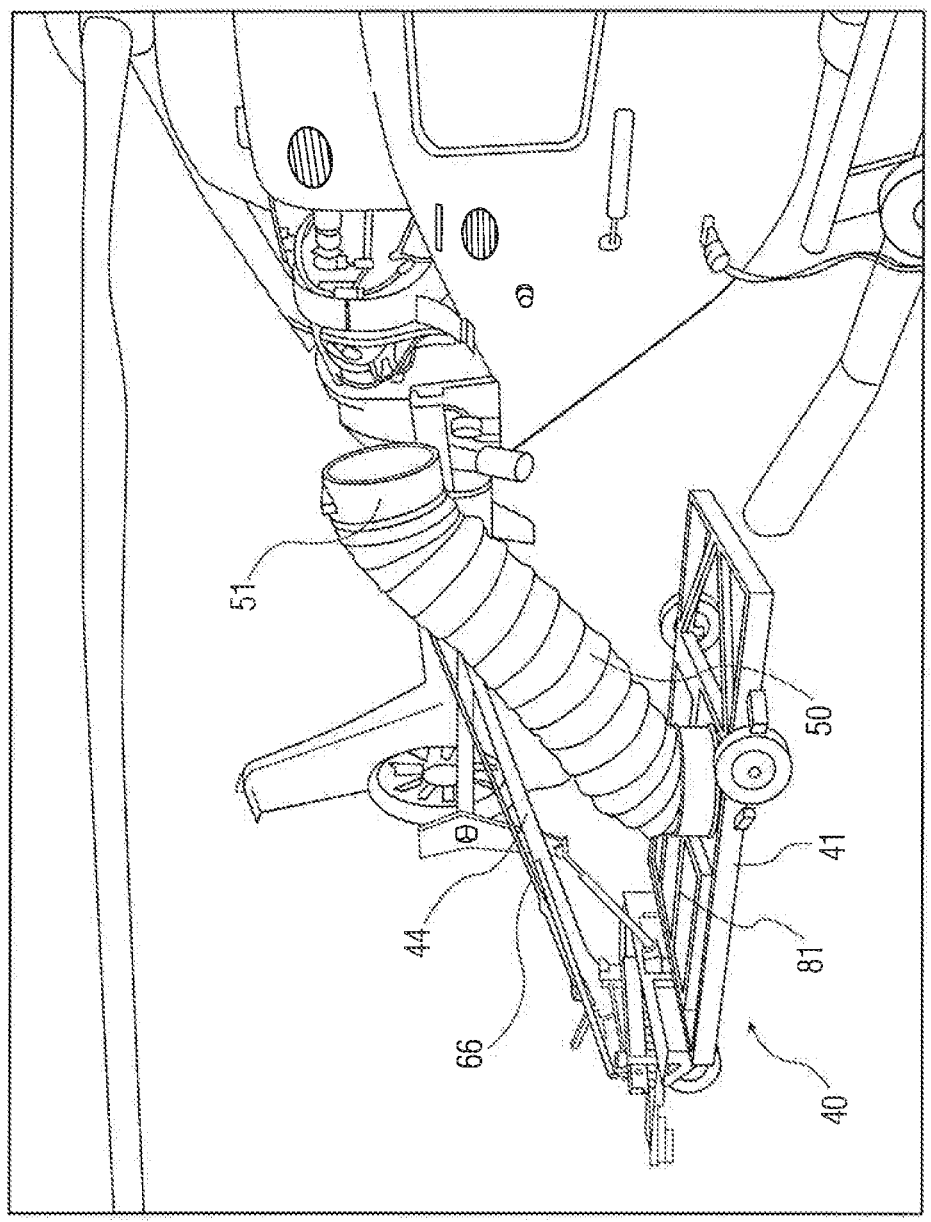
FIG. 6 shows the collection apparatus shown in FIG. 4 in use during cleaning of a helicopter turbine having a rear exhaust.

Examples of such applications are for helicopters, which often times have side exhaust located centrally on top of the aircraft body, or where the exhaust is at an angle deviating from perpendicular, as shown in FIG. 6.

Another example is the C-130 Hercules transport aircraft. This aircraft has rear exhausts on the underside of the wing which renders them inaccessible with the prior art systems mentioned above.

Figure 7B:
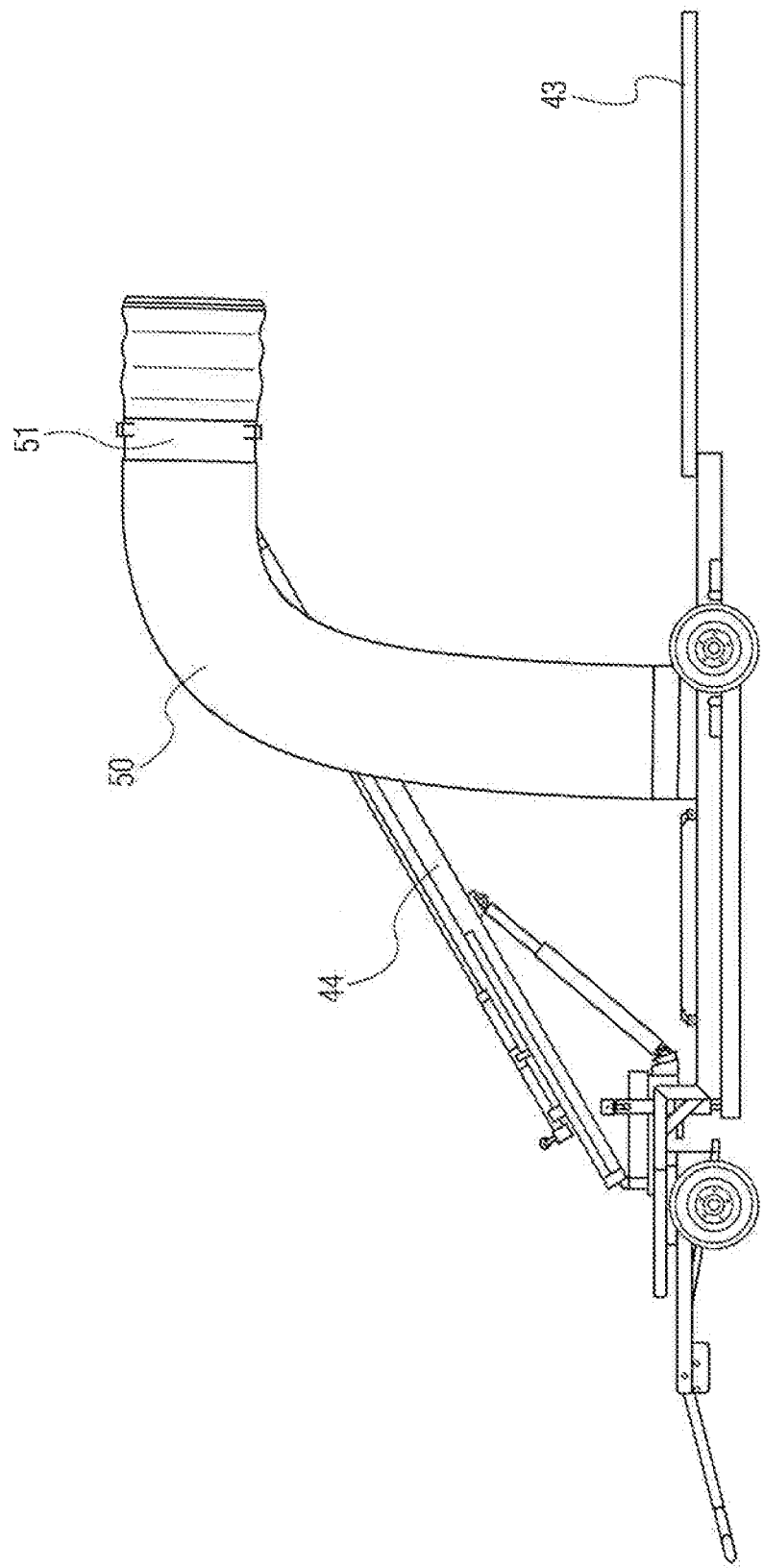

In FIG. 7 two different modes of operation of the system according to the present disclosure are shown, namely transport mode (FIG. 7a) and service mode (FIG. 7b).

FIG. 7a represents the transport mode, in which the arm 44 has been lowered to an essentially horizontal position, and wherein the drip pan 43 has been retracted to rest essentially entirely over the frame of the vehicle 40.

FIG. 7b shows the service mode at which the arm 44 has been raised. Here the drip pan 43 has been fully extended to be located beneath the inlet end 51 of the duct 50. The drip pan 43 is extended or retracted depending on how the engine outlet is configured, which can vary substantially between aircraft types and models.

To be able to enable higher service heights it is possible to adapt the design e.g. by providing a telescopic arm. In this case the duct is provided with a bellow structure to be able to be prolonged when the arm is extended and to be pressed together when the arm is retracted.

Although specific embodiments have been shown and described herein for purposes of illustration and exemplification, it is understood by those of ordinary skill in the art that the specific embodiments shown and described may be substituted for a wide variety of alternative and/or equivalent implementations without departing from the scope of the present invention. This application is intended to cover any adaptations or variations of the embodiments discussed herein. Consequently, the present invention is defined by the wordings of the appended claims and equivalents thereof.

What is claimed is:

1. A collection apparatus for collecting waste liquids from cleaning operations performed on an aircraft turbine engine, the apparatus comprising:
    a frame structure;
    a support arm having a first end pivotally attached to said frame structure and an opposite second end;
    a waste liquid storage tank;
    a duct having an inlet end adapted to be positioned at an exhaust of an aircraft and an opposite outlet end adapted to be removably and sealingly connected to said waste liquid storage tank, wherein said inlet end is pivotally attached to said second end of said support arm so as to be movable around at least a horizontal axis;
    an actuator device adapted to enable raising and lowering the support arm between an essentially horizontal transport position to an operative position adjacent the aircraft turbine engine exhaust; and
    a flexible duct connection, having a connection inlet end with a strap or an elastic rim around an opening to seal said inlet end of said flexible duct connection tightly around the aircraft exhaust, and a connection outlet end for removably and sealingly connecting to the inlet end of said duct, wherein said flexible duct connection is bendable both up/down and sideways and is expandable in length between said connection inlet end and said connection outlet end.

2. The collection apparatus according to claim 1, wherein the inlet end of said duct is attached to a duct support pivotally attached to the second end of the support arm of at least one pivot point (P1), pivotable around at least the horizontal axis.

3. The collection apparatus according to claim 1, wherein the support arm is in the operative position, the angle of the support arm is approximately 60-90 degrees.

4. The collection apparatus according to claim 2, said duct support comprising a bar structure and a ring, wherein the bar structure extends at least a part of the circumference of the ring and the ring extends around the circumference of the inlet end of the duct, and wherein said bar structure is attached to said support arm at said pivot point (P1).

5. The collection apparatus according to claim 1, wherein said waste liquid storage tank includes an air outlet, with said air outlet including a filter disposed therein for restricting the passage of liquid spray and contaminants from said waste liquid storage tank.

6. The collection apparatus according to claim 1, further comprising: a drip pan on the frame structure for collecting waste liquid emanating from the turbine engine during a cleaning operation.

7. The collection apparatus according claim 6, wherein said waste liquid storage tank (42) is provided on said frame structure beneath said drip pan.

8. The collection apparatus according to claim 6, wherein the drip pan is arranged to be slidable from a position located essentially on the frame structure to an extended position protruding out from the frame.

9. The collection apparatus according to claim 1, wherein the frame structure is part of a transport vehicle.

10. The collection apparatus according to claim 1, wherein the actuator device is actuated by any of hydraulic, pneumatic, mechanical or electrical means.

11. The collection apparatus according to claim 1, further comprising a resilient collar attached to the opening of the inlet end of the flexible duct connection.

12. The collection apparatus according to claim 11, wherein the collar is made of rubber.

* * * * *